US009923357B2

(12) United States Patent
Kojima

(10) Patent No.: US 9,923,357 B2
(45) Date of Patent: Mar. 20, 2018

(54) POWER SUPPLY SYSTEM, DISTRIBUTED POWER SOURCE SYSTEM, MANAGEMENT APPARATUS, AND POWER SUPPLY CONTROL METHOD

(71) Applicant: KYOCERA CORPORATION, Kyoto (JP)

(72) Inventor: Masaya Kojima, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 975 days.

(21) Appl. No.: 14/353,971

(22) PCT Filed: Oct. 16, 2012

(86) PCT No.: PCT/JP2012/076708

§ 371 (c)(1),
(2) Date: Apr. 24, 2014

(87) PCT Pub. No.: WO2013/061826

PCT Pub. Date: May 2, 2013

(65) Prior Publication Data

US 2014/0300187 A1 Oct. 9, 2014

(30) Foreign Application Priority Data

Oct. 27, 2011 (JP) ................................ 2011-236518

(51) Int. Cl.
*H02J 3/46* (2006.01)
*H02H 1/00* (2006.01)
*H02J 3/38* (2006.01)

(52) U.S. Cl.
CPC ........... *H02H 1/0007* (2013.01); *H02J 3/381* (2013.01); *H02J 2003/388* (2013.01); *Y10T 307/352* (2015.04)

(58) Field of Classification Search
CPC ..... H02H 1/0007; H02J 3/381; Y10T 307/352
USPC ........................................................... 307/24
See application file for complete search history.

(56) References Cited

U.S. PATENT DOCUMENTS

2008/0100145 A1* 5/2008 Ito ............................ H02J 3/38 307/125
2013/0030587 A1* 1/2013 El-Barbari ............. H02J 3/383 700/292

FOREIGN PATENT DOCUMENTS

EP 1919056 A2 5/2008
JP H08-065899 A 3/1996
JP 2007-209097 A 8/2007

(Continued)

OTHER PUBLICATIONS

International Search Report; PCT/JP2012/076708; dated Dec. 25, 2012.

(Continued)

*Primary Examiner* — Alfonso Perez Borroto
(74) *Attorney, Agent, or Firm* — Procopio Cory Hargreaves and Savitch LLP

(57) ABSTRACT

A power supply system comprises a plurality of distributed power source systems capable of supplying powers to loads 400 by performing an interconnection operation in parallel with grid 10 or an offline self-sustained operation. SOFC system 300 detects an abnormal state of the power supplied to loads 400. SOFC system 300 eases the abnormality detection conditions during the self-sustained operation than during the interconnection operation.

17 Claims, 12 Drawing Sheets

1
10
21 POWER PURCHASE METER
22 POWER SELLING METER
30 DISTRIBUTION BOARD
POWER RECOVERY DETECTOR ~31
SB
ELB
HEMS ~500
B1 a b
B3 B4 B5 B6 B7 B8
PV PCS ~120
320 SOFC PCS
LOAD LOAD LOAD LOAD LOAD
400-1 400-2 400-3 400-4 400-5
PV ~110
SOFC ~310
100
300

(56) References Cited

FOREIGN PATENT DOCUMENTS

JP 2010-108807 A 5/2010

OTHER PUBLICATIONS

The extended European search report issued by the European Patent Office dated May 18, 2015, which corresponds to European Patent Application No. 12843165.7-1804 and is related to U.S. Appl. No. 14/353,971.

Communication pursuant to Rules 70(2) and 70a(2) EPC issued by the European Patent Office dated Jun. 5, 2015, which corresponds to European Patent Application No. 12843165.7-1804 and is related to U.S. Appl. No. 14/353,971.

* cited by examiner

FIG. 7

| PARAMETER VALUE | SET NUMBER | | | | | |
|---|---|---|---|---|---|---|
| | 0 | 1 | 2 | 3 | 4 | 5 |
| OVR | 105.0 | 110.0 | 115.0 | 117.5 | 120.0 | 125.0 |
| UVR | 95.0 | 90.0 | 85.0 | 82.5 | 80.0 | 75.0 |
| OFR | 50.5 | 50.8 | 51.0 | 51.5 | 52.0 | 52.5 |
| | 60.5 | 60.8 | 61.0 | 61.5 | 62.0 | 62.5 |
| UFR | 49.5 | 49.2 | 49.0 | 48.5 | 48.0 | 47.5 |
| | 59.5 | 59.2 | 59.0 | 58.5 | 58.0 | 57.5 |

1
30
DISTRIBUTION BOARD
31
POWER FAILURE/ POWER RECOVERY DETECTOR
SB
UPS
32
ELB
B1
B3
B4
B5
B6
B7
B8
LOAD
400-1
LOAD
400-2
LOAD
400-3
LOAD
400-4
LOAD
400-5
SOFC PCS
120
320
SOFC
310
300
PV PCS
PV
110
100
POWER SELLING METER
22
POWER PURCHASE METER
21
HEMS
500
10

1
30
DISTRIBUTION BOARD
31
POWER RECOVERY DETECTOR
SB
ELB
B2
B3
B4
B5
B6
B7
B8
LOAD
400-1
400-2
400-3
400-4
400-5
SOFC PCS
320
SOFC
310
300
RECHARGEABLE BATTERY PCS
220
RECHARGEABLE BATTERY
210
200
22
POWER SELLING METER
21
POWER PURCHASE METER
HEMS
500
10

1
30
DISTRIBUTION BOARD
31
POWER RECOVERY DETECTOR
SB
ELB
B1
B2
B3
B4
B5
B6
B7
B8
LOAD
400-1
400-2
400-3
400-4
400-5
PV PCS
120
PV
110
100
RECHARGEABLE BATTERY PCS
220
RECHARGEABLE BATTERY
210
200
SOFC PCS
320
SOFC
310
300
22
POWER SELLING METER
21
POWER PURCHASE METER
10
HEMS
500

POWER SUPPLY SYSTEM, DISTRIBUTED POWER SOURCE SYSTEM, MANAGEMENT APPARATUS, AND POWER SUPPLY CONTROL METHOD

TECHNICAL FIELD

The present invention relates to a power supply system, a distributed power source system, a management apparatus, and a power supply control method for supplying powers to loads by using distributed power sources.

BACKGROUND ART

In recent years, as an auxiliary power source for a commercial power grid (hereinafter referred to as "a grid" accordingly), an introduction of a distributed power source system (such as a fuel cell system or a photovoltaic cell system) capable of supplying powers to loads by an interconnection operation in parallel with a grid is advanced in power consumers. A distributed power source system includes distributed power sources and power conditioners.

Further, during a power failure of a grid, it is known a distributed power source system is capable of supplying powers to loads by a self-sustained operation offline to the grid.

On the other hand, it is necessary a distributed power source system capable of an interconnection operation prevents a state that an output power of the distributed power source system enables to make a reverse power flow to a grid (namely, an islanding operation) during a power failure of the grid.

Therefore, it is known a distributed power source system has an islanding operation prevention function detecting an abnormality of a power supplied to loads (for example, a power failure of a grid or an unstable state of a grid power) and stopping the power output (for example, refer to Patent Literature 1).

CITATION LIST

Patent Literature

Patent Literature 1: Japanese Patent Application Publication No. 2007-209097

SUMMARY OF INVENTION

However, during an abnormality such as a power failure of a grid, because an output power of a distributed power source system is more unstable than a power of a grid when the distributed power source system performs a self-sustained operation simultaneously, there is a possibility that the islanding operation prevention function described above is performed and a power supply to loads stops.

The purpose of the present invention is to provide a power supply system, a distributed power source system, a management apparatus, and a power supply control method capable of reducing a possibility that a power supply to loads stops even when a distributed power source system performs a self-sustained operation during an abnormality such as a power failure of a grid.

A power supply system of the present invention comprises a plurality of distributed power source systems capable of supplying powers to loads by performing an interconnection operation in parallel with a commercial power system or an offline self-sustained operation, and any one of the plurality of distributed power source systems comprises an abnormality detection unit configured to detect an abnormal state of the power supplied to the loads. The abnormality detection unit eases abnormality detection conditions during the self-sustained operation than during the interconnection operation.

According to other features of the present invention, the abnormality detection unit detects an abnormality of the power supplied to the loads in order to prevent an islanding operation of at least any one of the plurality of distributed power source systems.

According to other features of the present invention, when the self-sustained operation is performed after the abnormal state of the power supplied to the loads is detected, the abnormality detection unit eases the abnormality detection conditions than during the interconnection operation.

According to other features of the present invention, the abnormality detection unit uses first abnormality detection parameters to detect an abnormality during the interconnection operation and uses second abnormality detection parameters that are eased than the first abnormality detection parameters instead of the first abnormality detection parameters during the self-sustained operation.

According to other features of the present invention, a distributed power source system comprising a management apparatus that is configured to manage operation states of the plurality of distributed power source systems and the abnormality detection unit comprises an abnormality occurrence notification unit configured to transmit an abnormality occurrence notification to the management apparatus when the abnormality detection unit detected an abnormality.

According to other features of the present invention, the power supply system comprises a breaker provided on a power line from the commercial power system (for example, Service Breaker SB) and the management apparatus comprises a breaker control unit configured to control the breaker to electrically disconnect the plurality of distributed power source systems and the loads from the commercial power system after receiving the abnormality occurrence notification.

According to other features of the present invention, the distributed power source system comprising the abnormality detection unit comprises an output control unit configured to stop a power output from the own system when the abnormality detection unit detected the abnormality.

According to other features of the present invention, the management apparatus comprises a transmission unit configured to transmit information for restarting a power output to the distributed power source system comprising the abnormality detection unit after the breaker control unit controlled the breaker.

According to other features of the present invention, the management apparatus comprises a control unit configured to perform controls to transmit parameter information for designating conditions eased than during the interconnection operation to the distributed power source system comprising the abnormality detection unit, as abnormality detection conditions during the self-sustained operation, after receiving the abnormality occurrence notification.

According to other features of the present invention, the plurality of distributed power source systems comprise a photovoltaic cell system and the control unit determines the abnormality detection conditions during the self-sustained operation according to a predicted power generation amount of the photovoltaic cell system.

According to other features of the present invention, the abnormality detection conditions during the self-sustained operation are determined such that a degree of the ease becomes larger as the predicted power generation amount of the photovoltaic cell system is smaller.

According to other features of the present invention, a plurality of loads are provided and the management apparatus comprises a power supply control unit configured to control a power supply to each of the plurality of loads after receiving the abnormality occurrence notification.

According to other features of the present invention, the power supply control unit controls to stop providing power supplies to the loads that are selected from the plurality of loads in accordance with the power amount that can be supplied to the plurality of loads and the power amount the plurality of loads require.

According to other features of the present invention, the distributed power source system comprising the abnormality detection unit is a fuel cell system.

A distributed power source system of the present invention comprises a distributed power source capable of supplying powers to loads by performing an interconnection operation in parallel with a commercial power system or an offline self-sustained operation and an abnormality detection unit configured to detect an abnormal state of the power supplied to the loads during the interconnection operation. The abnormality detection unit eases the abnormality detection conditions than during the interconnection operation when the self-sustained operation is performed after an abnormal state of the power supplied to the loads is detected.

A management apparatus of the present invention manages operation states of a distributed power source system capable of supplying powers to loads by performing an interconnection operation in parallel with a commercial power system or an offline self-sustained operation. A management apparatus comprises an abnormality detection unit configured to detect an abnormal state of the power supplied to the loads. The abnormality detection unit eases abnormality detection conditions during the self-sustained operation of the distributed power source system than during the interconnection operation.

A control method of the present invention is a control method in a power supply system comprising a distributed power source system capable of supplying powers to loads by performing an interconnection operation in parallel with a commercial power system or an offline self-sustained operation, comprises a step configured to detect an abnormal state of the power supplied to the loads, and eases the abnormality detection conditions during the self-sustained operation than during the interconnection operation.

According to the present invention, it is possible to provide a power supply system, a distributed power source system, a management apparatus, and a power supply control method capable of reducing a possibility that a power supply to loads stops even when a plurality of distributed power source systems perform a self-sustained operation simultaneously during an abnormality such as a power failure of a grid.

BRIEF DESCRIPTION OF DRAWINGS

FIG. 7 shows abnormality detection parameters related to the forth embodiment of the present invention.

DESCRIPTION OF THE EMBODIMENT

Figure 1:
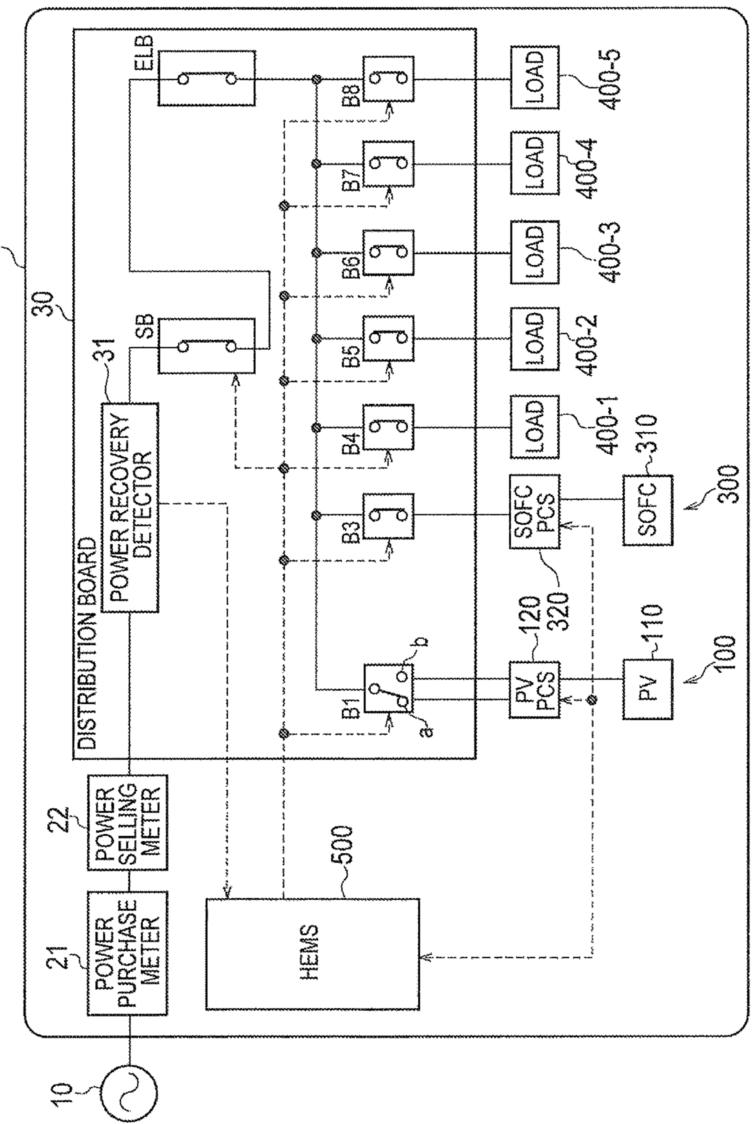
FIG. 1 is a block diagram of a power supply system related to the first embodiment to the forth embodiment of the present invention.

With reference to the drawings, the first embodiment to the fifth embodiment of the present invention and other embodiments will be described. In the drawings related to each of the following embodiments, the same or similar reference signs are applied to the same or similar portions.

First Embodiment (Overall Configuration of Power Supply System)

FIG. 1 is a block diagram of a power supply system related to the present embodiment. In FIG. 1, solid lines between the blocks show power lines and dashed lines show control lines. The control lines may be wireless.

As shown in FIG. 1, a power supply system related to the present embodiment is provided for a consumer 1 receiving a power (AC power) supply from a grid 10. A power supply system related to the present embodiment comprises a power purchase meter 21, a power selling meter 22, a distribution board 30, a photovoltaic cell (PV) system 100, a solid Oxide fuel cell (SOFC) system 300, a plurality of loads 400, and a home energy management system (HEMS) 500. The PV system 100, the SOFC system 300, and the plurality of loads 400 are connected with the distribution board 30 through power lines.

The power purchase meter 21 and the power selling meter 22 are provided on power lines between the grid 10 and the distribution board 30. The power purchase meter 21 measures powers (powers for power purchase) that the consumer 1 inputs from the grid 10. The power selling meter 22 measures powers (powers for power selling) that the consumer 1 outputs to the grid 10. The power purchase meter 21 and the power selling meter 22 transmit measurement results to the HEMS 500.

The distribution board 30 distributes powers from the grid 10 and the plurality of distributed power source systems (PV system 100 and SOFC system 300) to the loads 400. Further, the distribution board 300 outputs (sells powers) a surplus power of the powers from the PV system 100 that is not consumed in the load 400 to the grid 10.

The distribution board 30 comprises a power recovery detector 31, a service breaker SB, an earth leakage breaker ELB, a PV breaker B 1, a SOFC breaker B 3, and a plurality of load breakers B 4 to B 8.

The power recovery detector 31 is provided on a power line between the power selling meter 22 and the service breaker SB. The power recovery detector 31 detects a power recovery after a power failure of the grid 10 and transmits a notification concerning the detection result to the HEMS 500.

The service breaker SB is provided on a power line between the power recovery detector 31 and the earth leakage breaker ELB. The service breaker SB is switched from a conductive (ON) state to a nonconductive (OFF) state and from an OFF state to an ON state by control from the HEMS 500. In the present embodiment, the service breaker SB is equivalent to a breaker for electrically disconnecting the plurality of distributed power source systems (PV system 100, SOFC system 300) and the loads 400 from the grid 10.

The earth leakage breaker ELB is provided on a power line between the service breaker SB and the breakers (PV breaker B 1, SOFC breaker B 3, and the plurality of loads breakers B 4 to B 8). The earth leakage breaker ELB switches from an ON state to an OFF state when a leakage is detected.

The PV breaker B 1 is provided on a power line between the earth leakage breaker ELB and a PV power conditioner (PCS (Power conditioning system)) 120. The PV breaker B 1 is switched from an input a to an input b and from an input b to an input a by control from the HEMS 500. The input a is connected to an ordinary power line between the PC PCS 120. The input b is connected to a self-sustained power line between the PC PCS 120. The input a is used during an ordinary time (during an interconnection operation), and the input b is used during a self-sustained operation.

The SOFC breaker B 3 is provided on a power line between the earth leakage breaker ELB and the SOFC PCS 320. The SOFC breaker B 3 is switched from an ON state to an OFF state and from an OFF state to an ON state by control from the HEMS 500.

The load breakers B 4 to B 8 are provided corresponding to the load 400-1 to the load 400-5. The load breaker B 4 is provided on a power line between the earth leakage breaker ELB and the load 400-1. The load breakers B 5 to B 8 are similarly provided respectively. Each of the load breakers B 4 to B 8 is switched from an OFF state to an ON state and from an ON state to an OFF state by control from the HEMS 500.

The PV system 100 comprises a PV 110 and a PV PCS 120.

The PV 110 receives sunlight, performs power generation, and outputs powers acquired by the power generation to the PV PCS 120. A power generation amount of the PV 110 changes in accordance with an amount of solar radiation irradiated on the PV 110.

The PV PCS 120 converts the power inputted from the PV 110 from DC to AC and outputs it to the distribution board 30. The PV PCS 120 interconnects the PV 100 with the grid 10 and performs an interconnection operation. During the interconnection operation, the PV PCS 120 outputs powers that are in accordance with states (such as voltage, electric current, phase, and frequency) of the grid 10.

The PV PCS 120 has an islanding operation prevention function. The islanding operation prevention function is a function that a power generation apparatus capable of an interconnection operation detects such as a power failure or its sign and stops operations. As an example, in Japan, for reasons of safety and workability security of power company side, it is required a power generation apparatus capable of an interconnection operation avoids a state that an output power of the power generation apparatus enables to make a reverse power flow (an islanding operation) when such as a power failure of the grid is detected. Thereby, it is required a power generation apparatus capable of an interconnection operation has an islanding operation prevention function.

For further details, the PV PCS 120 monitors states (such as voltage, electric current, phase, and frequency) of power lines between the distribution board 30, determines that the grid is in an abnormal state such as a power failure when the voltage or the frequency monitored exceeds the range defined by the abnormality detection parameters and stops power outputs. A determination method of an abnormality such as a power failure is substantially the same as an active scheme detection method in an islanding operation prevention function. Also, the PV PCS 120 can output powers by a self-sustained operation not interconnecting the PV 110 with the grid 10.

The SOFC system 300 comprises the SOFC 310 and the SOFC PCS 320.

The SOFC 310 is an example of a fuel cell, performs power generation by an electrochemical reaction between hydrogen taken out from such as natural gas and oxygen in the air, and outputs powers acquired by the power generation to the SOFC PCS 320. A power generation amount of the SOFC 310 changes in accordance with the amounts of the gas inputted to the SOFC 310 and the air. The amounts of the gas and the air are controlled by the SOFC PCS 320.

The SOFC PCS 320 converts the power inputted from the SOFC 310 from DC to AC and outputs it to the distribution board 30. The SOFC PCS 320 interconnects the SOFC 310 with the grid 10 and performs an interconnection operation. During the interconnection operation, the SOFC PCS 320 outputs powers that are in accordance with states (such as voltage, electric current, phase, and frequency) of the grid 10. The SOFC PCS 320 has an islanding operation prevention function. For further details, the SOFC PCS 320 monitors states (such as voltage, electric current, phase, and frequency) of the power lines between the distribution board 30, determines that the grid is in a power failure when the voltage or the frequency monitored exceeds the range defined by the abnormality detection parameters and stops power outputs. A determination method of a power failure is substantially the same as an active scheme detection method in an islanding operation prevention function. Also, the SOFC PCS 320 can output powers by a self-sustained operation not interconnecting the SOFC 310 with the grid 10.

The loads 400 input powers through power lines from the distribution board 30, consume the power inputted and operate. Each of the loads 400 is an electric equipment, such as a lighting, an air conditioner, a refrigerator and a television.

The HEMS 500 performs various power managements in the consumer 1. In the present embodiment, the HEMS 500 is equivalent to a management apparatus configured to manage operation states of a plurality of distributed power source systems. The HEMS 500 performs communication with the power recovery detector 31, various breakers, PV PVC 120, and SOFC PCS 320, transmits and receives control signals. Furthermore, the HEMS 500 may perform communication with the power purchase meter 21 and the power selling meter 21. In addition, the communication such as the transmission and the reception of the control signals is performed by using a signal format compliant with a prescribed communication protocol such as the ECHONET lite standard, the ZigBee SEP 2.0 standard, or the KNX standard.

(Configuration of SOFC PCS)

Figure 2:
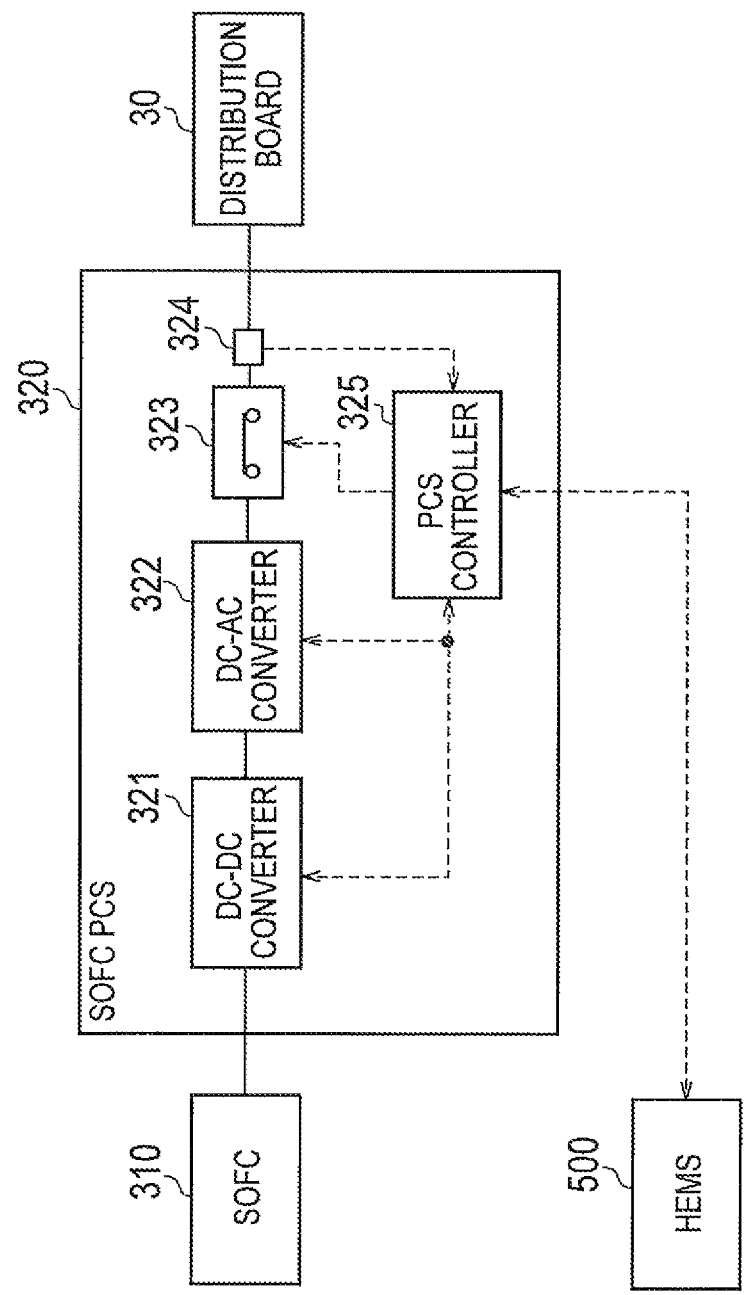
FIG. 2 is a block diagram of a SOFC PCS related to the first embodiment to the fifth embodiment of the present invention.

FIG. 2 is a block diagram of the SOFC PCS 320. In FIG. 2, solid lines between the blocks show power lines and dashed lines show control lines. The PV PCS 120 is configured the same as the SOFC PCS 320.

As shown in FIG. 2, the SOFC PCS 320 comprises DC-DC converter 321, DC-AC converter 322, relay 323, sensor 324, and PCS controller 325.

The DC-DC converter 321 is provided on a power line between the SOFC 310 and the DC-AC converter 322. The DC-DC converter 321 converts the power from the SOFC 310 from DC to DC and outputs it to the DC-AC converter 322. The DC-DC converter 321 performs conversion from DC to DC in accordance with control from the PCS controller 325.

The DC-AC converter 322 is provided on a power line between the DC-DC converter 321 and the relay 323. The DC-AC converter 322 converts the power from the DC-DC converter 321 from DC to AC and outputs it to the relay 323. The DC-AC converter 322 performs conversion from DC to AC in accordance with control from the PCS controller 325.

The relay 323 is provided on a power line between the DC-AC converter 322 and the sensor 324. The relay 323 is switched from an ON state to an OFF state and from an OFF state to an ON state by control from the PCS controller 325. The SOFC PCS 320 can output powers when the relay 323 is in an ON state, and the SOFC PCS 320 cannot output powers when the relay 323 is in an OFF state.

The sensor 324 is provided on a power line between the relay 323 and the distribution board 30. The sensor 324 measures voltage or frequency of the power line between the relay 323 and the distribution board 30, and outputs a measurement result to the PCS controller 325.

The PCS controller 325 comprises processors and storages and performs various controls. The PCS controller 325 controls the DC-DC converter 321, the DC-AC converter 322, and the relay 323 based on the measurement result from the sensor 324 and the control signals from the HEMS 500. Also, the PCS controller 325 transmits information concerning operation states of the SOFC PCS 320 to the HEMS 500.

In the present embodiment, during an interconnection operation, the PCS controller 325 detects an abnormality of the power supplied to the loads 400 based on first abnormality detection parameters for preventing an islanding operation and an measurement result of the sensor 324. The first abnormality detection parameters may be set as, for example, an upper limit value 115 V and a lower limit value 85 V for voltage values, and an upper limit value 51 Hz and a lower limit value 49 Hz for frequency values. The PCS controller 325 determines that an abnormality is detected when the measurement result of the sensor 324 exceeds the range defined by the first abnormality detection parameters. Accordingly, in the present embodiment, the sensor 324 and the PCS controller 325 constitute an abnormality detection unit.

The PCS controller 325 switches the relay 323 from an ON state to an OFF state when using the first abnormality detection parameters and detecting an abnormality. As a result, the power output from the SOFC PCS 320 stops. Accordingly, in the present embodiment, the relay 323 and the PCS controller 325 constitute an output control unit.

An abnormality detection by using the first abnormality detection parameters and the output stop during the abnormality detection are performed in accordance with an ordinary islanding operation prevention function.

Furthermore, the PCS controller 325 transmits an abnormality occurrence notification to the HEMS 500 by a signal format compliant with the prescribed protocol described above such as the ECHONET lite standard when using the first abnormality detection parameters and detecting an abnormality. The abnormality occurrence notification may be a notification that a power failure occurs and also may be a notification that a power failure sign occurs. Accordingly, in the present embodiment, the PCS controller 325 is equivalent to an abnormality occurrence notification unit.

Thereafter, the PCS controller 325 receives parameter information from the HEMS 500. The parameter information specifies second abnormality detection parameters that are eased than the first abnormality detection parameters. In other words, the range of voltage and frequency defined by the second abnormality detection parameters is larger than the range of voltage and frequency defined by the first abnormality detection parameters. The second abnormality detection parameters may be set as, for example, an upper limit value 120 V and a lower limit value 80 V for voltage values, and an upper limit value 52 Hz and a lower limit value 48 Hz for frequency values. The parameter information may be a value of the second abnormality detection parameter itself; for example, as shown in FIG. 7, it may be an index showing a set of predetermined values of the second abnormality detection parameters.

Further, the PCS controller 325 receives information for restarting the power output from the SOFC system 300 (the SOFC PCS 320). The information may be, for example, a restart instruction of a power output, a start instruction of a self-sustained operation, and a notification that the service breaker SB is turned off (hereinafter referred to as "breaker off notification"). In the followings, an example that the PCS controller 325 receives a breaker off notification will be described.

The PCS controller 325 switches the relay 323 from the OFF state to the ON state when receiving the breaker off notification. As a result, restart of the power output from the SOFC PCS 320 becomes possible. Further, the PCS controller 325 controls the DC-DC converter 321 and the DC-AC converter 322 based on a measurement result from the sensor 324. As the details described below, at this point, because the service breaker SB is in the OFF state, the SOFC PCS 320 will perform a self-sustained operation (an operation not interconnecting with the grid 10).

Furthermore, during such a self-sustained operation, the PCS controller 325 changes abnormality detection parameters to the second abnormality detection parameters specified in the parameter information from the HEMS 500 and performs abnormality detection. Because the second abnormality detection parameters are eased than the first abnormality detection parameters, an abnormality becomes to be detected hardly than during an interconnection operation. The PCS controller 325 switches the relay 323 from an ON state to an OFF state when using the second abnormality detection parameters and detecting an abnormality. As a result, the power output from the SOFC PCS 320 stops.

Thereafter, the PCS controller 325 receives a power recovery notification from the HEMS 500. The power recovery notification may be a notification that the power is recovered and also may be information of an instruction for returning to the first abnormality detection parameters. The PCS controller 325 returns the second abnormality detection parameters to the first abnormality detection parameters and performs abnormality detection when receiving the power recovery notification from the HEMS 500. After returning to the first abnormality detection parameters, an islanding operation prevention motion is performed in accordance with an ordinary islanding operation prevention function.

(Configuration of HEMS)

Figure 3:
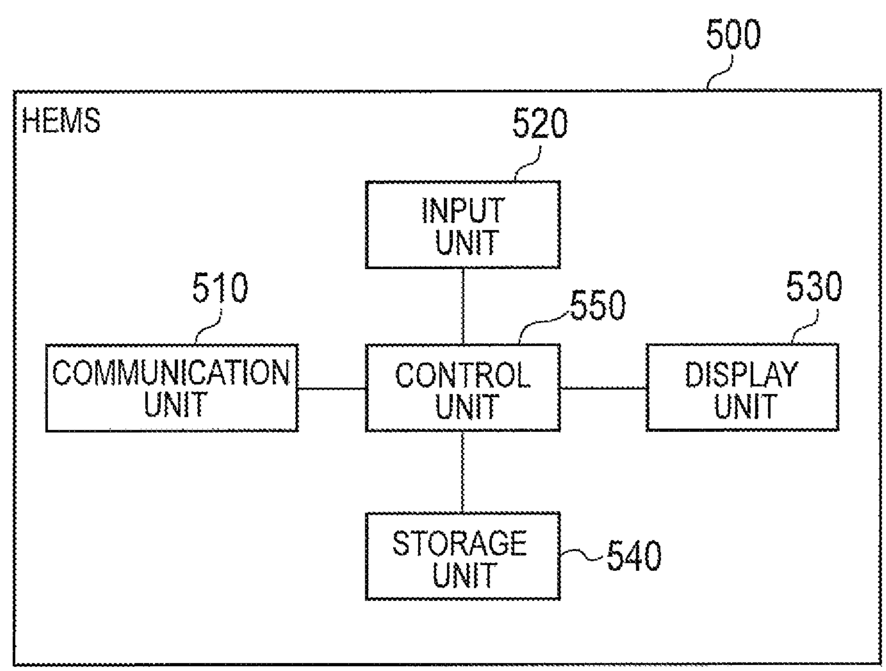
FIG. 3 is a block diagram of a HEMS (Home Energy Management System) 500 related to the first embodiment to the fifth embodiment of the present invention.

FIG. 3 is a block diagram of the HEMS 500.

As shown in FIG. 3, the HEMS 500 comprises a communication unit 510, an input unit 520, a display unit 530, a storage unit 540, and a control unit 550.

The communication unit 510 performs communication with each equipment provided in the consumer 1. Specifically, the communication unit 510 performs communication with the power recovery detector 31, various breakers, PV PCS 120, and SOFC PCS 320, and transmits and receives control signals by a signal format compliant with a prescribed communication protocol.

The input unit 520 accepts an operation input from user. The display unit 530 performs various displays. The input unit 520 and the display unit 530 may be integrated as a touch panel. The display unit 530 may display a power purchase amount or a power selling amount in time series based on information acquired from the power purchase meter 21 and the power selling meter 22.

The storage unit 540 comprises storages and stores various information used for controls in the control unit 550. The control unit 550 comprises processors and controls various functions of the HEMS 500.

The storage unit 540 stores such as first abnormality detection parameters and second abnormality detection parameters. The first abnormality detection parameters and the second abnormality detection parameters may be inputted by user through operation of the input unit 520, and also may be values that the control unit 550 calculated based on various information stored in the storage unit 540.

The control unit 550 controls for switching the service breaker SB from an ON state to an OFF state when the communication unit 510 receives an abnormality occurrence notification from the SOFC PCS 320. Specifically, it makes the communication unit 510 transmit an instruction for switching the service breaker SB to an OFF state. As a result, the service breaker SB turns to be in an OFF state and electrically disconnect the plurality of distributed power source systems (PV system 100, SOFC system 300) and the loads 400 from the grid 10. Thereby, in the present embodiment, the communication unit 510 and the control unit 550 constitute a breaker control unit.

The control unit 550 controls the communication unit 510 to transmit information for restarting the power output from the SOFC system 300 (here, referred to as "breaker off notification") to the plurality of distributed power source systems (PV system 100, SOFC system 300), after turning the service breaker SB to an OFF state. Thereby, in the present embodiment, the communication unit 510 and the control unit 550 constitute a transmission unit.

Further, the control unit 550 controls the communication unit 510 to transmit parameter information for specifying the second abnormality detection parameters to the plurality of distributed power source systems (PV system 100, SFC system 300), after turning the service breaker SB to an OFF state. As described above, the parameter information may be the value of the second abnormality detection parameter itself; for example, as shown in FIG. 7, it may be an index showing a set of predetermined values of the second abnormality detection parameters.

Thereafter, the control unit 550 controls the communication unit 510 to transmit a power recovery notification to the plurality of distributed power source systems (PV system 100, SOFC system 300), after the communication unit 510 receives a signal showing that the power is recovered from the power recovery detector 31. As described above, the power recovery notification may be a notification that the power is recovered and also may be information of an instruction for returning to the first abnormality detection parameters.

(Operation of Power Supply System)

Figure 4:
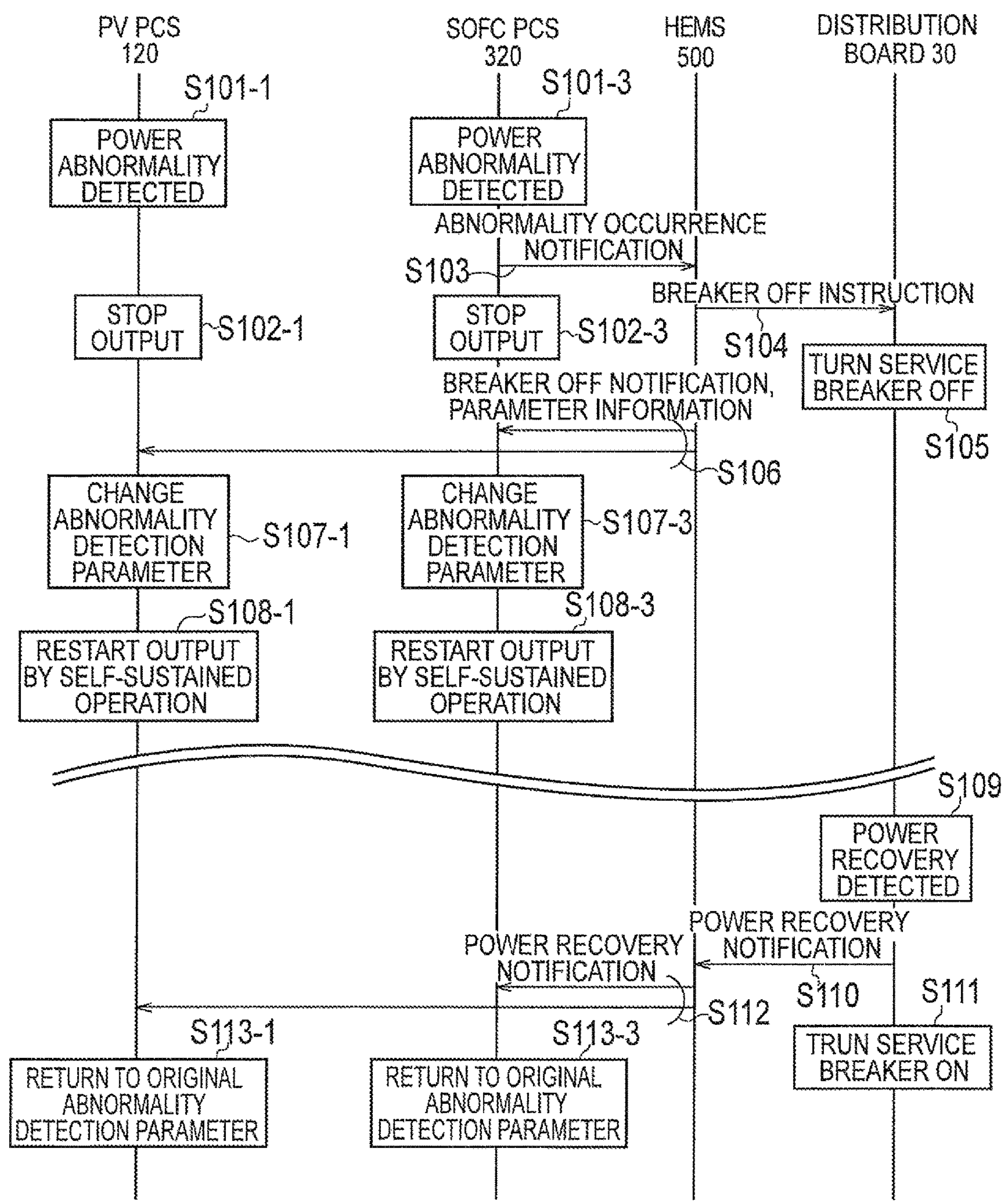
FIG. 4 is a sequence diagram of operations in a power supply system related to the first embodiment of the present invention when a power failure occurs.

FIG. 4 is a sequence diagram of operations in a power supply system related to the present embodiment when a power failure occurs.

As shown in FIG. 4, in step S101-1, the PV PCS 120 detects an abnormality of power; in step S101-3, the SOFC PCS 320 detects an abnormality of power.

In step S102-1, the PV PCS 120 stops a power output in accordance with the abnormality detection; in step S102-3, the SOFC PCS 320 stops a power output in accordance with the abnormality detection.

In step S103, the SOFC PCS 320 transmits an abnormality occurrence notification to the HEMS 500.

In step S104, the HEMS 500 transmits an instruction for switching the service breaker SB to an OFF state to the distribution board 30 when receiving the abnormality occurrence notification from the SOFC PCS 320.

In step S105, the distribution board 30 switches the service breaker SB to an OFF state in accordance with the breaker off instruction from the HEMS 500.

In step S106, the HEMS 500 transmits the breaker off notification to the PV PCS 120 and the SOFC PCS 320. Further, the HEMS 500 transmits parameter information to the PV PCS 120 and the SOFC PCS 320 as an instruction for changing parameters.

In step S107-1, the PV PCS 120 changes the first abnormality detection parameters to the second abnormality detection parameters in accordance with the parameter information from the HEMS 500. Further, in step S107-3, the SOFC PCS 320 changes the first abnormality detection parameters to the second abnormality detection parameters in accordance with the parameter information from the HEMS 500.

In step S108-1, the PV PCS 120 restarts the power output by the self-sustained operation in accordance with the breaker off notification from the HEMS 500. Further, in step S108-3, the SOFC PCS 320 restarts the power output by the self-sustained operation in accordance with the breaker off notification from the HEMS 500.

Thereafter, in step S109, the power recovery detector 31 of the distribution board 30 detects a power recovery.

In step S110, the power recovery detector 31 transmits a signal showing that the power is recovered to the HEMS 500.

In step S111, the distribution boards 30 switches the service breaker SB from the OFF state to the ON state in accordance with the power recovery detection.

In step S112, the HEMS 500 transmits the power recovery notification to the PV PCS 120 and the SOFC PCS 320 in accordance with the signal showing that the power is recovered from the power recovery detector 31.

In step S113-1, the PV PCS 120 returns to the first abnormality detection parameters in accordance with the power recovery notification from the HEMS 500. Further, in step S113-3, the SOFC PCS 320 returns to the first abnormality detection parameters corresponding to the power recovery notification from the HEMS 500. In other words, the power recovery notification also has an aspect as a signal for instructing parameter change.

(Summary)

As described above, the power supply system comprises the plurality of distributed power source systems (PV system 100, SOFC system 300) capable of supplying powers to the loads 400 by an interconnection operation with the grid 10 or a self-sustained operation. The SOFC system 300 uses the first abnormality detection parameters for preventing an islanding operation and detects an abnormality of the power supplied to the loads 400 during an interconnection operation. Further, after the abnormality of the power supplied to the loads 400 is detected, the SOFC system 300 uses the second abnormality detection parameters eased than the first abnormality detection parameters instead of the first abnormality detection parameters during a self-sustained operation.

Accordingly, because the power supplied to the loads 400 is hardly detected as abnormal during a self-sustained operation, the possibility that the power supply to the loads 400 stops can be reduced even when the plurality of distributed power source systems perform a self-sustained operation simultaneously in a power failure of the grid 10. Further, despite changing abnormality detection parameters, because an abnormality of the power supplied to the loads 400 is detectable, the power supply to the loads 400 can be stopped in a condition such as the power supplied to the loads 400 is excessive.

Second Embodiment

As followings, regarding a second embodiment, the differences from the first embodiment will be described mainly.

In the first embodiment described above, the PV PCS 120 and the SOFC PCS 320 have restarted the power output by performing a self-sustained operation simultaneously. However, in a condition such as the change to the self-sustained operation of the PV PCS 120 is performed manually, as described below, the PV PCS 120 and the SOFC PCS 320 may restart the power output at a different timing.

Figure 5:
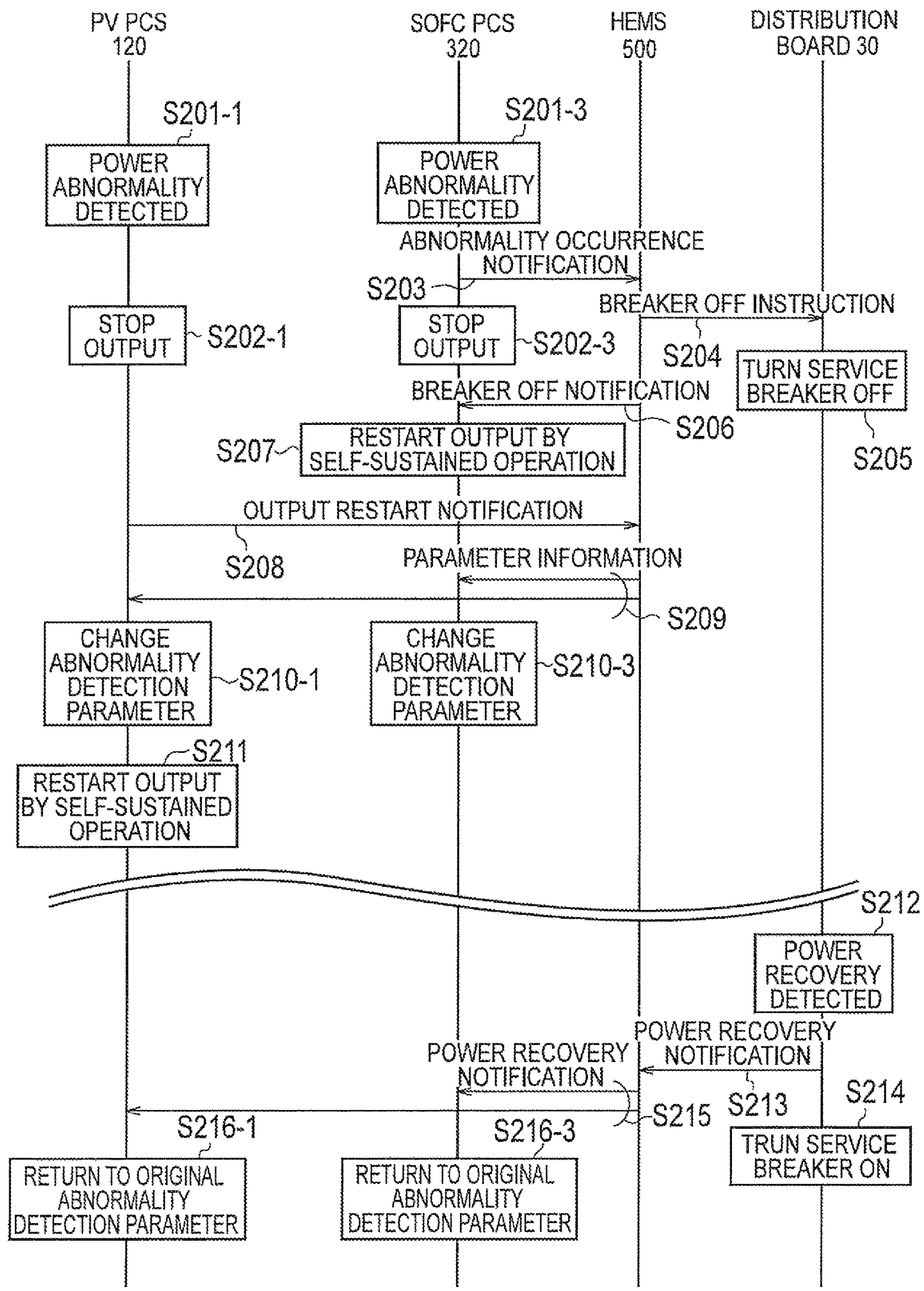
FIG. 5 is a sequence diagram of operations in a power supply system related to the second embodiment of the present invention when a power failure occurs.

FIG. 5 is a sequence diagram of operations in a power supply system related to the present embodiment when a power failure occurs. Because steps S201 to S205 are the same as the steps S101 to S105 described in the first embodiment, the description will be made from step S206.

As shown in FIG. 5, in step S206, the HEMS 500 transmits the breaker off notification to the PV PCS 120 and the SOFC PCS 320.

In step S207, the SOFC PCS 320 restarts the power output by the self-sustained operation in accordance with the breaker off notification from the HEMS 500.

In step S208, the PV PCS 120 transmits a notification (an advanced notification) that the power output will be restarted by a self-sustained operation to the HEMS 500. When the PV PCS 120 restarts the power output by the self-sustained operation, it becomes necessary to change the first abnormality detection parameters to the second abnormality detection parameters.

In step S209, the HEMS 500 transmits parameter information for changing to the second abnormality detection parameters in accordance with the output restart notification from the PV PCS 120 to the PV PCS 120 and the SOFC PCS 320.

In step S210-1, the PV PCS 120 changes the first abnormality detection parameters to the second abnormality detection parameters in accordance with the parameter information from the HEMS 500. Further, in step S210-3, the SOFC PCS 320 changes the first abnormality detection parameters to the second abnormality detection parameters in accordance with the parameter information from the HEMS 500.

In step S211, the PV PCS 120 restarts the power output by the self-sustained operation. Regarding the subsequent operations, because they are the same as the first embodiment, the description will be omitted.

Third Embodiment

As followings, regarding a third embodiment, the differences from the first embodiment will be described mainly.

In the present embodiment, the HEMS 500 controls the power supply to the loads 400 after receiving an abnormality occurrence notification from the SOFC PCS 320. Specifically, the control unit 550 of the HEMS 500 controls the power supply to each of the loads 400 by controlling the communication unit 510 to transmit a switch instruction to an OFF state to at least one of the load breakers B 4 to B 8.

In the present embodiment, the communication unit 510 and the control unit 550 acquire information about the power amount that can be supplied to the loads 400 by performing communication with the PV PCS 120 and the SOFC PCS 320. Further, the communication unit 510 and the control unit 550 acquire information about the power amount that the loads 400 require by performing communication with the sensor provided in the distribution board 30. Then, the communication unit 510 and the control unit 550 control to stop the power supply to the loads 400 selected from the loads 400 in accordance with the power amount that can be supplied to the loads 400 and the power amount that the loads 400 require.

For example, in a condition that the power amount that can be supplied to the loads 400 is insufficient for the power amount that the loads 400 require, the control unit 55 calculates the insufficient power amount and determines to stop the power supply to at least one of the loads 400 requiring the power amount which is equivalent to the insufficient power amount. Further, the control unit 550 specifies load breakers corresponding to the loads 400 that the power supply should be stopped, and controls the communication unit 510 to transmit a switch-off instruction to the load breakers. Accordingly, the power amount that the loads 400 require can become less than the power amount that can be supplied to the loads 400.

Hereafter, the HEMS 500 may make the load breakers B 4 to B 8 control the power supply to each of the loads 400 by controlling the load breakers B 4 to B 8 directly to be in an OFF state, and also may be control the loads 400 directly. In this case, the HEMS 500 controls the power supply to each of the loads 400 by using a communication protocol such as the Echonet Lite standard or ZigBee (registered trademark), performing direct communication with the loads 400, and transmitting a control signal making the power supply to an OFF state or a control signal transiting to a power saving state to the loads 400.

Figure 6:
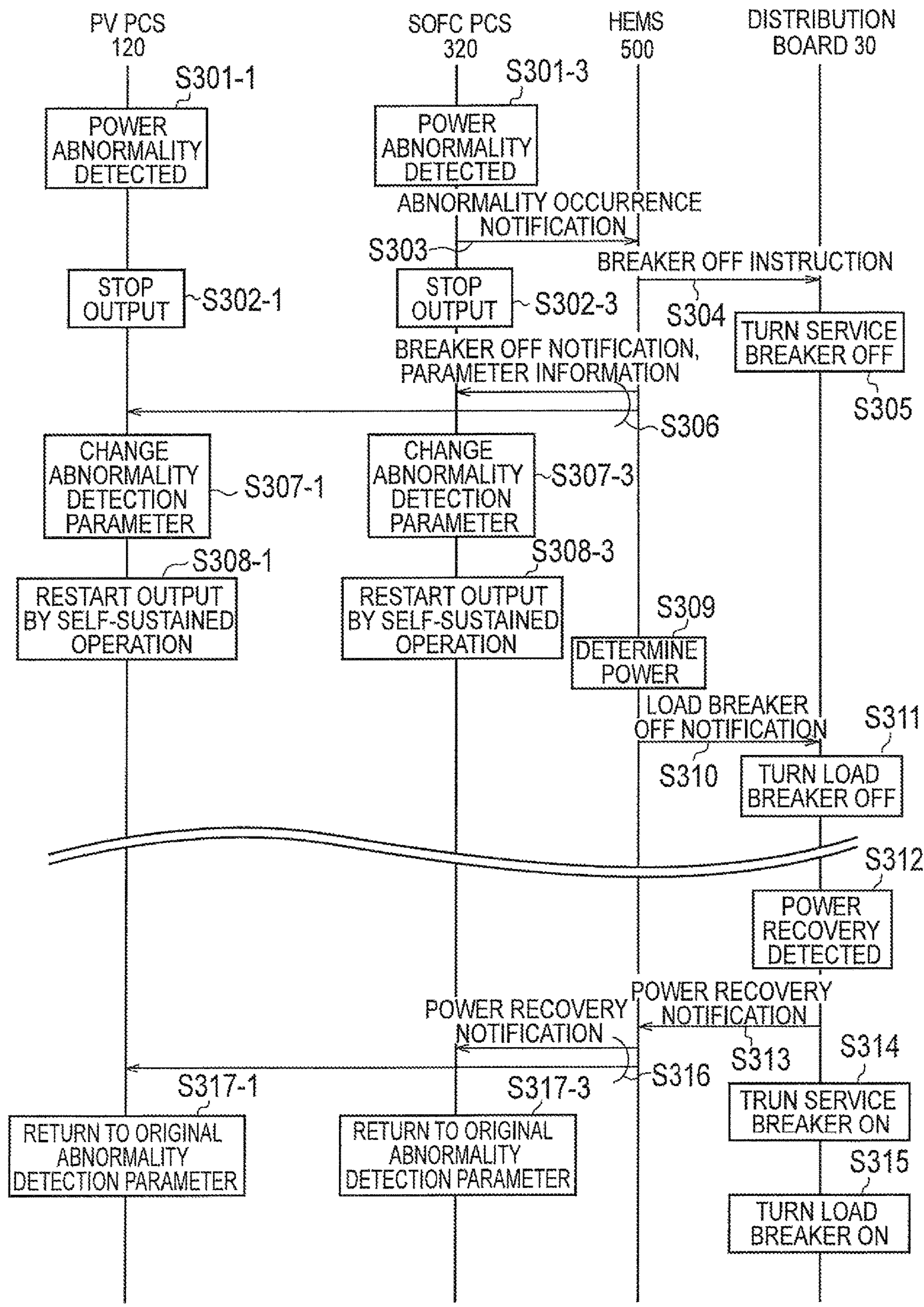
FIG. 6 is a sequence diagram of operations in a power supply system related to the third embodiment of the present invention when a power failure occurs.

FIG. 6 is a sequence diagram of operations in a power supply system related to the present embodiment when a power failure occurs. Because steps S301 to S308 are the same as the steps S101 to S108 described in the first embodiment, the description will be made from step S309.

As shown in FIG. 6, in step S309, the HEMS 500 determines whether the power amount that can be supplied to the loads 400 is insufficient to the power amount that the loads 400 require or not after the PV PCS 120 and the SOFC PCS 320 restarted the output by the self-sustained operation. Here, it is determined that the power amount is insufficient.

In step S310, the HEMS 500 transmits a control signal to the load breakers corresponding to the loads 400 that the power supply should be stopped as a switch-off instruction, or transmits a direct control signal to the loads 400.

In step S311, the loads 400 that received the switch-off instruction switches from an ON state to an OFF state.

Thereafter, in step S312, the power recovery detector 31 of the distribution board 30 detects the power recovery.

In step S313, the power recovery detector 31 transmits the notification that the power is recovered to the HEMS 500.

In step S314, the distribution board 30 switches the service breaker SB from the OFF state to the ON state in accordance with the power recovery detection.

In step S315, the distribution board 30 switches the load breaker turned to an OFF state in the step S311 from the OFF state to the ON state in accordance with the power recovery detection.

In step S316, the HEMS 500 transmits the power recovery notification to the PV PCS 120 and the SOFC PCS 320 in accordance with the signal showing that the power is recovered from the power recovery detector 31.

In step S317-1, the PV PCS 120 returns to the first abnormality detection parameters corresponding to the power recovery notification from the HEMS 500. Further, in step S317-3, the SOFC PCS 320 returns to the first abnormality detection parameters corresponding to the power recovery notification from the HEMS 500.

Further, the HEMS 500 may acquire periodically information about the power amount that can be supplied to the loads 400 and information about the power amount that the loads 400 require. In this case, the HEMS 500 repeats the step S309 until receiving the signal showing that the power is recovered from the power recovery detector 31. In the step S309, as a result of determining whether the power amount that should be supplied to the loads 400 is insufficient to the power amount that the loads 400 require or not, the loads 400 that the power supply should be stopped may be increased. In this case, in the step S310, the HEMS 500 transmits a switch-off instruction to the load breakers corresponding to the loads 400 that the power supply should be stopped additionally. Thereafter, in the step S311, the loads 400 receiving the switch-off instruction newly switch from an ON state to an OFF state. On the other hand, in the step S309, when it is determined that there are the loads 400 that the power supply can be restarted, the HEMS 500 can transmit a switch-on instruction to the load breakers corresponding to the loads 400 that the power supply can be restarted.

Forth Embodiment

As followings, regarding a forth embodiment, the differences from the first embodiment will be described mainly.

In the first embodiment described above, the second abnormality detection parameters are prescribed fixedly. On the other hand, in the present embodiment, the control unit 550 of the HEMS 500 determines the second abnormality detection parameters in accordance with a predicted power generation amount of the PV system 100.

The control unit 550 acquires information showing a predicted power that the PV system 100 will generate after the current time (hereafter, referred to as "predicted power generation amount information"). The predicted power generation amount is provided from such as a service center connected with an external network (for example, an internet) to the HEMS 500 of the consumer 1. In this case, the HEMS 500 can provide such as regional information of the consumer 1 in advance as element information that is necessary when the predicted power generation amount is produced in the service center, etc. Further, the control unit 550 can acquire weather (for example, amount of solar radiation) information of the day in the region of the consumer 1 (hereafter, referred to as "weather information") from the external network, predict a power generation amount of the PV system 100 according to the acquired weather information, and acquire the predicted power generation amount information. Then, the control unit 550 determines second abnormality detection parameters of a large degree of the ease as the predicted power generation amount is smaller.

FIG. 7 shows abnormality detection parameters related to the present embodiment. In FIG. 7, OVR shows an upper limit voltage value, UVR shows a lower limit voltage value, OFR shows an upper limit frequency value, and UFR shows a lower limit frequency value. The HEMS 500 and each PCS may hold a table such as shown in FIG. 7 in advance.

As shown in FIG. 7, the abnormality detection parameters of the set number (index) 0 are equivalent to the first abnormality detection parameters used as default values during an ordinary time (during an interconnection operation). On the other hand, any one of the abnormality detection parameters of set numbers 1 to 5 is selected as the second abnormality detection parameter.

When the predicted power generation amount is large (such as in daytime and in a sunny weather), the control unit 550 selects such as the abnormality detection parameters of set number 1 or set number 2 as the second abnormality detection parameters of a small degree of the ease. On the other hand, when the predicted power generation amount is small (such as at night or in a cloudy weather), such as the abnormality detection parameters of set number 4 or set number 5 are selected as the second abnormality detection parameters of a large degree of the ease.

Accordingly, the second abnormality detection parameters can be set properly by determining the second abnormality detection parameters in accordance with the predicted power generation amount of the PV system 100.

Figure 8:
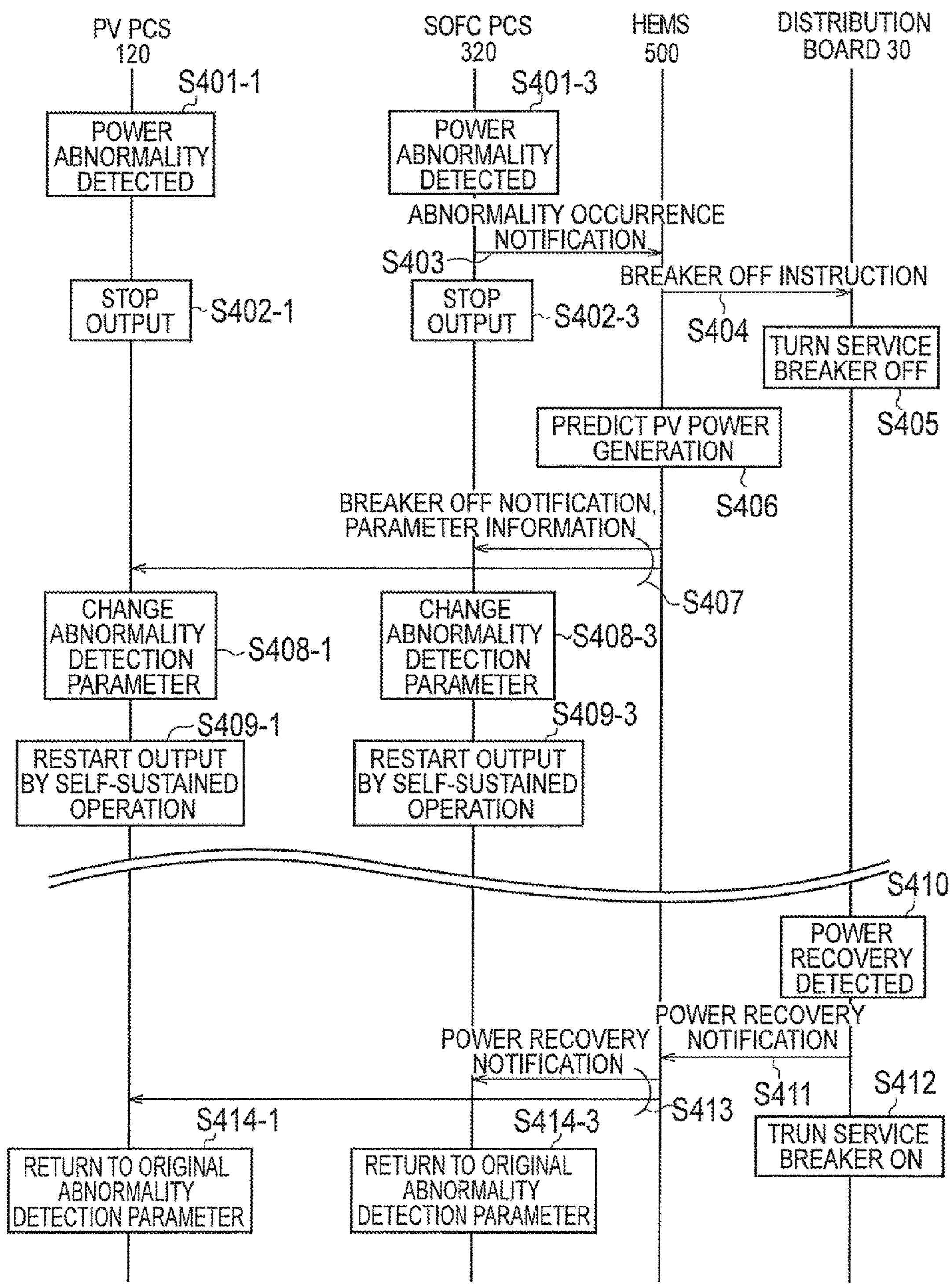
FIG. 8 is a sequence diagram of operations in a power supply system related to the forth embodiment of the present invention when a power failure occurs.

FIG. 8 is a sequence diagram of operations in a power supply system related to the present embodiment when a power failure occurs. Because steps S401 to S405 are the same as the steps S101 to S105, the description will be made from step S406.

As shown in FIG. 8, in the step S406, the HEMS 500 acquires the predicted power generation amount of the PV system 100 and determines the second abnormality detection parameters by using the method described above before transmitting parameter information.

In step S407, the HEMS 500 transmits a breaker off notification to the PV PCS 120 and the SOFC PCS 320. Further, the HEMS 500 transmits the parameter information determined in the step S406 to the PV PCS 120 and the SOFC PCS 320. Regarding the subsequent operations, because they are the same as the first embodiment, the description will be omitted.

Fifth Embodiment

As followings, regarding a fifth embodiment, the differences from the first embodiment will be described mainly.

In each embodiment described above, the PV PCS 120 and SOFC PCS 320 detect the power abnormality and stop the power output. On the other hand, in the present embodiment, the power output can be continued by covering the power by an uninterruptable power supply (UPS) during the specified time from the occurrence of a power failure of the grid 10 (or its sign) and changing to the second abnormality detection parameters during the period.

Figure 9:
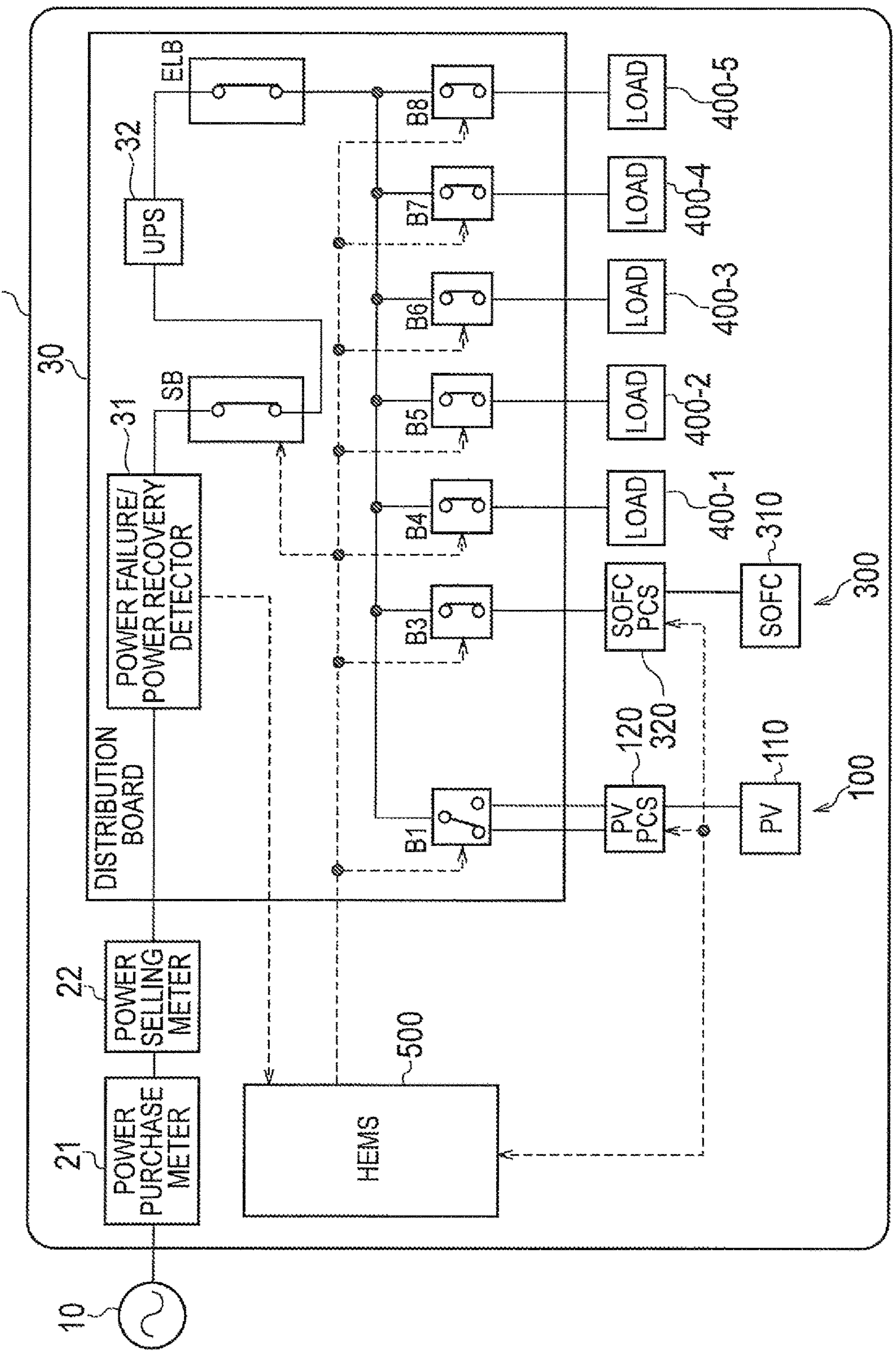
FIG. 9 is a block diagram of a power supply system related to the fifth embodiment of the present invention.

FIG. 9 is a block diagram of a power supply system related to the present embodiment. In FIG. 9, solid lines between the blocks show power lines and dashed lines show control lines. The control lines may be wireless.

As shown in FIG. 9, the power supply system related to the present embodiment comprises UPS 32 provided on a power line between the service breaker SB and the earth leakage breaker ELB. The UPS 32 has a built-in small size storage battery and provides powers from the storage battery to the loads 400 during a power failure or an unstable state of the grid 10. Further, in the present embodiment, the power recovery detector 31 also has a function configured to detect a power failure (or its sign) and notifying it to the HEMS 500.

Part of the output power of the UPS 32 is provided to the PV PCS 120 and the SOFC PCS 320. The power provided here is matched substantially with the parameters configured to be the conditions for determining such as voltage, electric current, phase, and frequency from the grid 10 before a power failure or an unstable state occurs by an active scheme detection method in an islanding operation prevention function. Accordingly, because of the power supply from the UPS 32, the PV PCS 120 and the SOFC PCS 320 do not recognize the power failure or the unstable state of the grid 10 and do not perform the islanding operation prevention function.

Figure 10:
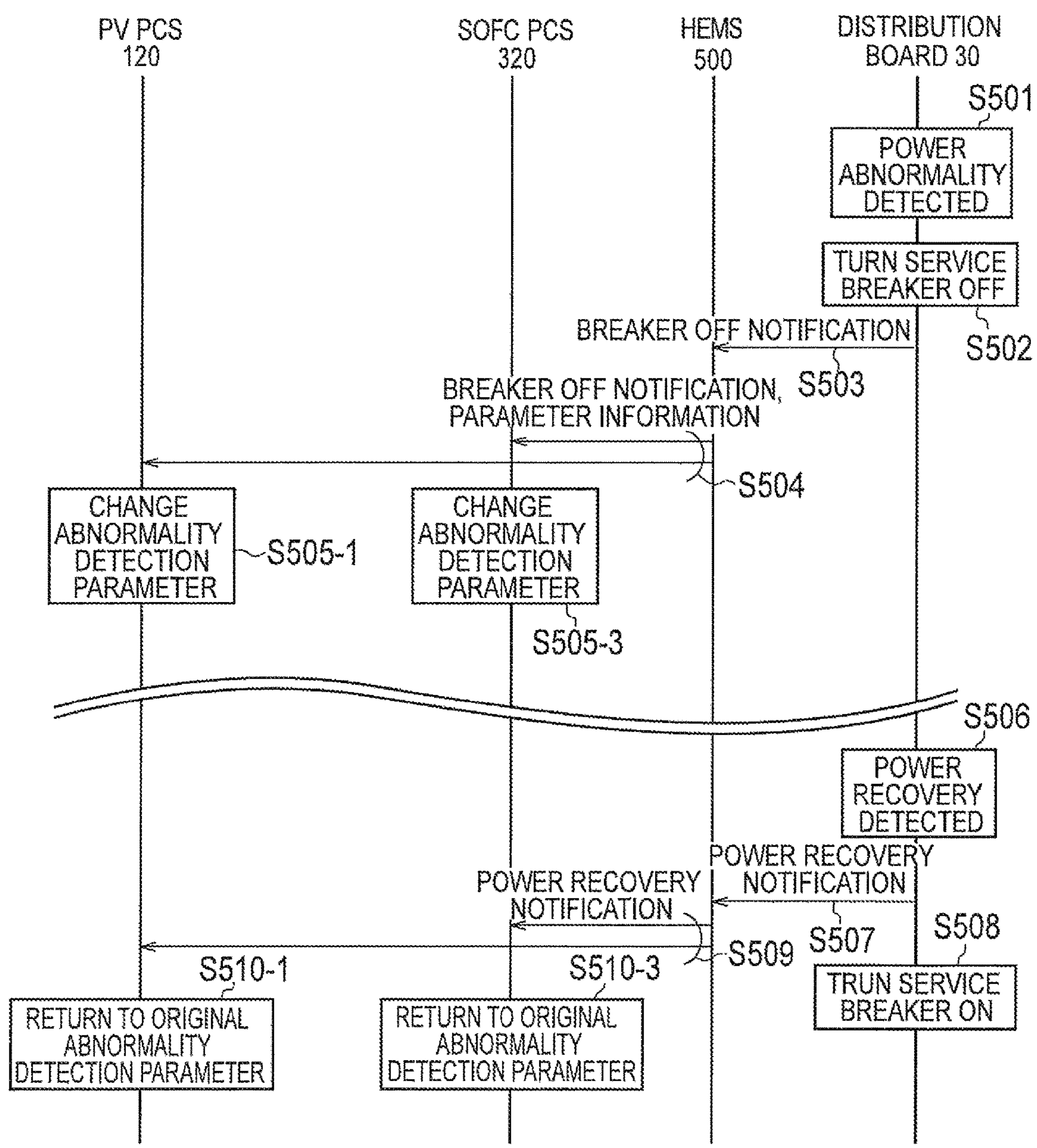
FIG. 10 is a sequence diagram of operations in a power supply system related to the fifth embodiment of the present invention.

FIG. 10 is a sequence diagram of operations in a power supply system related to the present embodiment when a power supply occurs.

As shown in FIG. 10, in step S501, the power failure/the power recovery detector 31 of the distribution board 30 detects a power abnormality.

In step S502, the distribution board 30 switches the service breaker SB to an OFF state in accordance with the abnormality detection by the power failure/power recovery detector 31.

In step S503, the distribution board 30 transmits a breaker off notification to the HEMS 500.

In step S504, the HEMS 500 transmits the breaker off notification to the PV PCS 120 and the SFC PCS 320. Further, the HEMS 500 transmits the parameter information to the PV PCS 120 and the SOFC PCS 320.

In step S505-1, the PV PCS 120 changes the first abnormality detection parameters to the second abnormality detection parameters in accordance with the parameter information from the HEMS 500. Further, in step S505-3, the SOFC PCS 320 changes the first abnormality detection parameters to the second abnormality detection parameters in accordance with the parameter information from the HEMS 500.

Thereby, in step S506, the power failure/power recovery detector 31 detects the power recovery.

In step S507, the power failure/power recovery detector 31 transmits a signal showing that the power is recovered to the HEMS 500.

In step S508, the distribution board 30 switches the service breaker SB from the OFF state to the ON state in accordance with the power recovery detection from the power failure/power recovery detector 31.

In step S509, the HEMS 500 transmits the power recovery notification to the PV PCS 120 and the SOFC PCS 320 in accordance with the signal showing that the power is recovered from the power recovery detector 31.

In step S510-1, the PV PCS 120 returns to the first abnormality detection parameters in accordance with the power recovery notification from the HEMS 500. Further, in step S510-3, the SOFC PCS 320 returns to the first abnormality detection parameters in accordance with the power recovery notification from the HEMS 500.

Other Embodiments

As described above, the present invention has been described according to each of the embodiments. However, it must not be understood that the discussions and the drawings constituting a part of these disclosures limit the present invention. Various modifications, embodiments, and operation techniques will be apparent to those of ordinary skill in the art in viewing of these disclosures.

For example, each of the embodiments described above may be implemented not only independently, but also combined mutually.

Further, in each of the embodiments described above, it has been described that the PCS controller 325 of the SOFC PCS 320 is equivalent to an abnormality detection unit and an abnormality occurrence notification unit; however, the HEMS 500 may be the abnormality detection unit and the abnormality occurrence notification unit. In this case, the HEMS 500 detects an abnormal state of the power supplied to the loads 400 based on the first abnormality detection parameters during an interconnection operation. When an abnormality is detected, the HEMS 500 notifies the abnormality occurrence to the PV PCS 120 and the SOFC PCS 320 (PCS controller 325), and the PV PCS 120 and the SOFC PCS 320 stop the power output. Further, during a self-sustained operation, the HEMS 500 detects an abnormal state of the power supplied to the loads 400 based on the second abnormality detection parameters. The HEMS 500 notifies the abnormality occurrence to the PV PCS 120 or the SOFC PCS 320 that the abnormality is detected and stops the power output. The HEMS 500 can use information received from the PV PCS 120 and the SOFC PCS 320 for the abnormality detection, or also can use information receiving from the sensor provided in the distribution board 30. The communication between the HEMS 500, the PV PCS 120, and the SOFC PCS 320 is performed by using the signal format compliant with the communication protocol such as the ECHONET lite described above.

Figure 11:
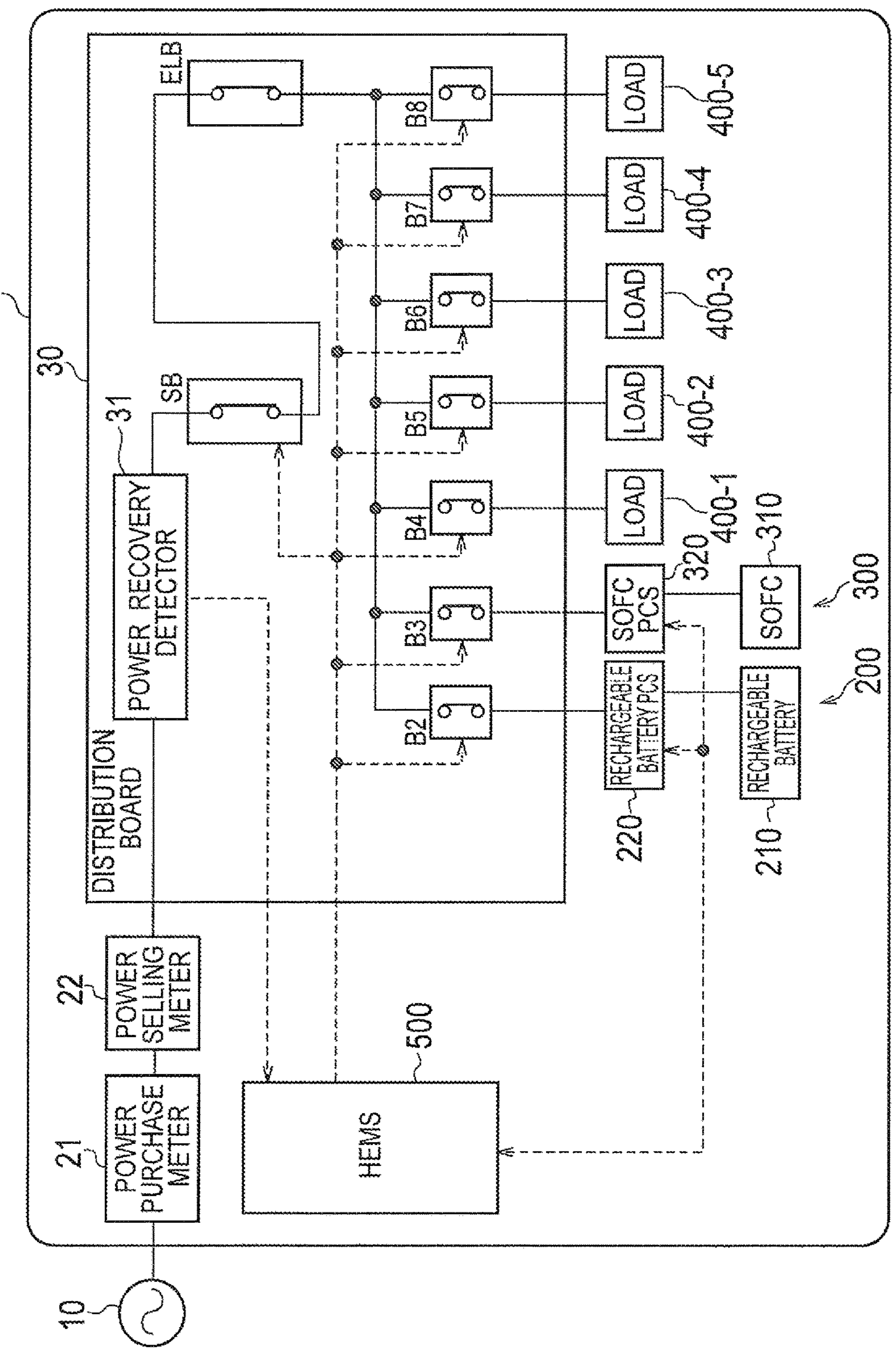
FIG. 11 is a block diagram of the first modification of the power supply system related to the first embodiment to the fifth embodiment of the present invention.

Further, instead of the PV system 100 described in each of the embodiments described above, a storage battery system can be used. FIG. 11 is a block diagram of a power supply system related to a modification 1 of each of the embodiments described above. The power supply system shown in FIG. 11 comprises storage battery system 200 instead of the PV system 100 described in each of the embodiments described above. The storage battery system 200 comprises storage battery 210 and storage battery PCS 220. The storage battery PCS 220 not only has a DC-AC conversion function for converting DC power acquired by discharge of the storage battery 210, but also has a DC-AC conversion function for charging the storage battery 210. Other configurations are the same as each of the embodiments described above. The sequences of operations of the power supply system related to each of the embodiments described above when a power failure occurs are applicable to the power supply system shown in FIG. 11.

Figure 12:
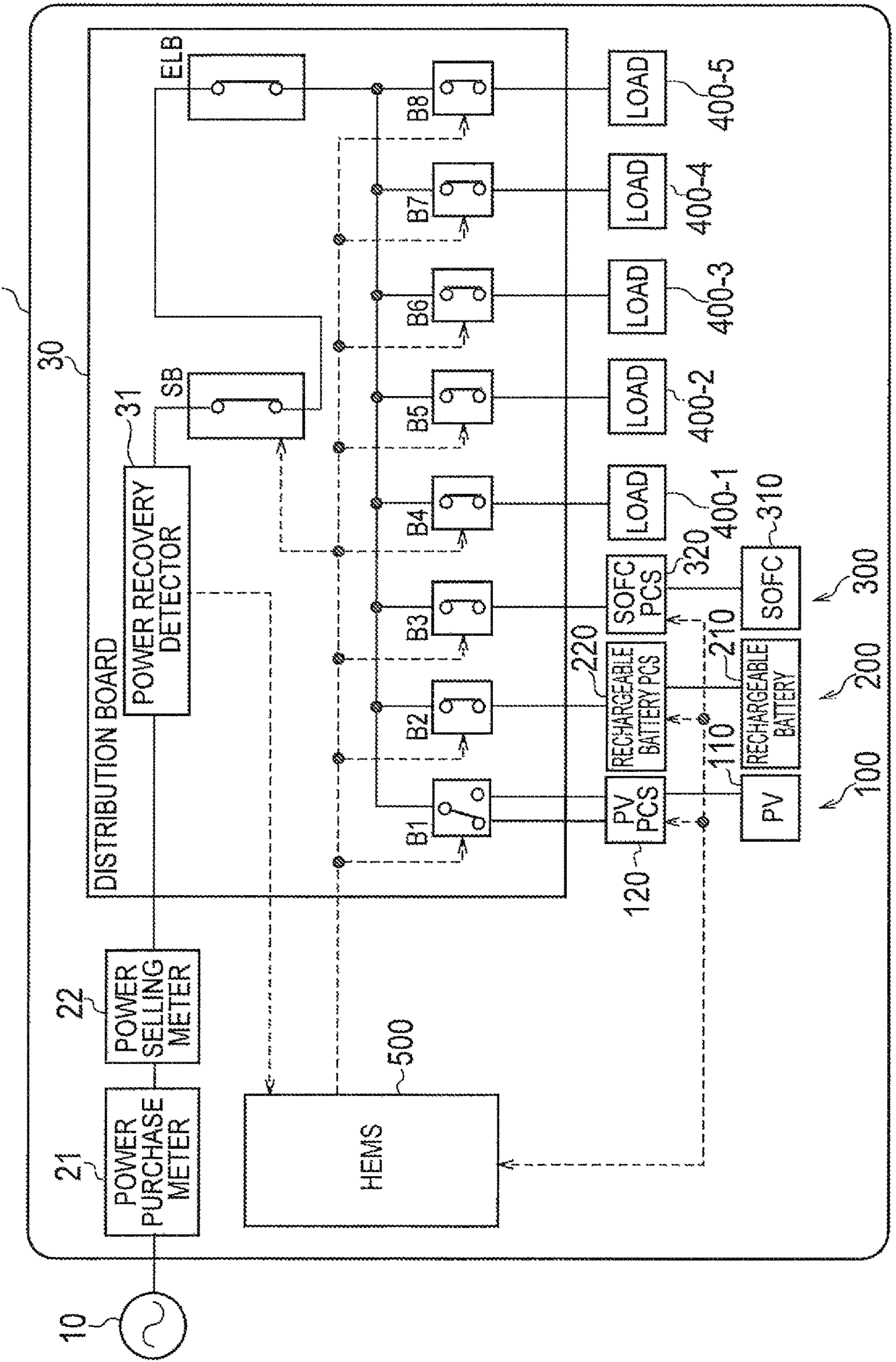
FIG. 12 is a block diagram of the second modification of the power supply system related to the first embodiment to the fifth embodiment of the present invention.

Furthermore, the storage battery system 200 can be used simultaneously with the PV system 100. FIG. 12 is a block diagram of a power supply system related to a modification 2 of the embodiments described above. The power supply system shown in FIG. 12 comprises the PV system 100 described in each of the embodiments described above, the SOFC system 300, and additionally, the storage battery system 200. Other configurations are the same as each of the embodiments described above. The sequences of operations of the power supply system related to each of the embodiments described above when a power failure occurs are applicable to the power supply system shown in FIG. 12.

In each of the embodiments described above, the SOFC system 300 has been described as an example for the fuel cell system related to the present invention. However, it can be, for example, a fuel cell system using fuel cells of other systems such as PEFC.

In each of the embodiments described above, the HEMS, an energy management system, provided in home has been described as an example for the management apparatus related to the present invention. However, such as a building energy management system (BEMS) or a community energy management system (CEMS) can be the management apparatus related to the present invention.

Note that the entire content of the Japanese Patent Application No. 2011-236518 (filed on Oct. 27, 2011) is incorporated herein by reference.

INDUSTRIAL APPLICABILITY

According to the present invention, it is possible to provide power supply systems, distributed power source systems, a power supply control method capable of reducing a possibility that power supplies to loads stop even when a plurality of distributed power source systems perform a self-sustained operation simultaneously during a power failure of a grid.

The invention claimed is:

1. A power supply system comprising:

a plurality of distributed power source systems capable of supplying powers to loads by performing an interconnection operation performed in a state connected with a commercial power grid or a self-sustained operation performed in a state disconnected with the commercial power grid, wherein any one of the plurality of distributed power source systems comprising an abnormality detection unit configured to detect an abnormal state of the power supplied to the loads, the abnormality detection unit is configured to apply a first abnormality detection condition during the interconnection operation and apply a second abnormality detection condition during the self-sustained operation, the second abnormality detection condition is different from the first abnormality detection condition, and the second abnormality detection condition is an eased condition relative to the first abnormality detection condition so that the abnormal state is less likely to be detected in the self-sustained operation than in the interconnection operation.

2. The power supply system according to claim 1, wherein the abnormality detection unit detects an abnormality of the power supplied to the loads in order to prevent at least any one of the plurality of distributed power source systems from performing an islanding operation.

3. The power supply system according to claim 1, wherein the abnormality detection unit applies the second abnormality detection condition when the self-sustained operation is performed after a detection of the abnormal state of the power supplied to the loads.

4. The power supply system according to claim 1, wherein the abnormality detection unit uses first abnormality detection parameters in the interconnection operation and uses second abnormality detection parameters in the self-sustained operation, and a range of voltage or frequency defined by the second abnormality detection parameters is larger than a range of voltage or frequency defined by the first abnormality detection parameters.

5. The power supply system according to claim 1, comprising a management apparatus configured to manage operation states of the plurality of distributed power source systems, wherein the distributed power source system comprising the abnormality detection unit comprises an abnormality occurrence notification unit configured to transmit an abnormality occurrence notification to the management apparatus when the abnormality detection unit detected an abnormality.

6. The power supply system according to claim 5, comprising a breaker provided on a power line from the commercial power grid, wherein the management apparatus comprises a breaker control unit configured to control the breaker to electrically disconnect the plurality of distributed power source systems and the loads from the commercial power grid after receiving the abnormality occurrence notification.

7. The power supply system according to claim 6, wherein the distributed power source system comprising the abnormality detection unit comprises an output control unit configured to stop a power output from the own system when the abnormality detection unit detected an abnormality.

8. The power supply system according to claim 7, wherein the management apparatus comprises a transmission unit configured to transmit information for restarting a power output to the distributed power source system comprising the abnormality detection unit after the breaker control unit controlled the breaker.

9. The power supply system according to claim 5, wherein the management apparatus comprises a control unit configured to perform controls to transmit parameter information for designating the second abnormality detection condition to a distributed power source system comprising the abnormality detection unit.

10. The power supply system according to claim 9, wherein the plurality of distributed power source systems comprise a photovoltaic cell system; and wherein the control unit determines the second abnormality detection condition in accordance with a predicted power generation amount of the photovoltaic cell system.

11. The power supply system according to claim 10, wherein the second abnormality detection condition is determined such that an eased degree becomes larger as the predicted power generation amount of the photovoltaic cell system is smaller.

12. The power supply system according to claim 5, wherein a plurality of loads are provided; and wherein the management apparatus comprises a power supply control unit configured to control a power supply to each of the plurality of loads after receiving the abnormality occurrence notification.

13. The power supply system according to claim 12, wherein the power supply unit controls to stop a power supply to the loads selected from the plurality of loads in accordance with the power amount that can be supplied to the plurality of loads and the power amount that the plurality of loads require.

14. The power supply system according to claim 5, wherein the distributed power source system comprising the abnormality detection unit is a fuel cell system.

15. A distributed power source system comprising:

a distributed power supply capable of supplying powers to loads by performing an interconnection operation performed in a state connected with a commercial power grid or a self-sustained operation performed in a state disconnected with the commercial power grid; and an abnormality detection unit configured to detect an abnormal state of the power supplied to the loads, wherein the abnormality detection unit is configured to apply a first abnormality detection condition during the interconnection operation and apply a second abnormality detection condition during the self-sustained operation, the second abnormality detection condition is different from the first abnormality detection condition, and the second abnormality detection condition is an eased condition relative to the first abnormality detection condition so that the abnormal state is less likely to be detected in the self-sustained operation than in the interconnection operation.

16. A management apparatus managing an operation state of a distributed power source system capable of supplying powers to loads by performing an interconnection operation performed in a state connected with a commercial power grid or a self-sustained operation performed in a state disconnected with the commercial power grid, comprising:

an abnormality detection unit configured to detect an abnormal state of the power supplied to the loads, wherein the abnormality detection unit configured to apply a first abnormality detection condition during the interconnection operation and apply a second abnormality detection condition during the self-sustained operation, the second abnormality detection condition is different from the first abnormality detection condition, and the second abnormality detection condition is an eased condition relative to the first abnormality detection condition so that the abnormal state is less likely to be detected in the self-sustained operation than in the interconnection operation.

17. A control method in a power supply system comprising a distributed power source system capable of supplying powers to loads by performing an interconnection operation performed in a state connected with a commercial power grid or a self-sustained operation performed in a state disconnected with the commercial power grid, comprising:

detecting an abnormal state of the power supplied to the loads;

applying a first abnormality detection condition during the interconnection operation; and applying a second abnormality detection condition during the self-sustained operation, wherein the second abnormality detection condition is different from the first abnormality detection condition, wherein the second abnormality detection condition is an eased condition relative to the first abnormality detection condition so that the abnormal state is less likely to be detected in the self-sustained operation than in the interconnection operation.

* * * * *